Patented June 12, 1934

UNITED STATES PATENT OFFICE 1,962,617

MANUFACTURE OF ENAMEL WARE

Jacob E. Rosenberg, Pittsburgh, Pa., assignor to Enamelers Guild, Inc., a corporation of Pennsylvania No Drawing. Application October 4, 1932, Serial No. 636,182

2 Claims. (Cl. 91—73)

This invention relates to the manufacture of enamel ware, and, specifically, to enamel ware consisting of a steel base and a glass coating. It is known to be desirable to prepare the surface of the steel for the reception of the glass by forming upon it a film of cobalt oxide, and heretofore that film of cobalt oxide has been prepared by applying to the steel surface an aqueous solution of a more complex cobalt salt, and, after drying, by raising the so-coated article to relatively high temperature, and thus, by means of heat, bringing about the breaking down of the more complex salt and the formation of the oxide of cobalt upon the surface. See Letters Patent Nos. 1,779,273; 1,805,143; and 1,819,816. This method of forming upon the surface of the steel a film of cobalt oxide, somewhat complicated, involves the application of relatively high heat and an ensuing cooling step, before the filmed surface can be dipped in the slip from which the ultimate glass coating is formed. If the attempt be made, as the attempt has been made, to dispense with the first high-temperature step, to dip the article in the slip while still coated with the more complex salt, and, in the same heating operation by which the slip material is fused, to effect the reduction of the more complex salt to the oxide, various practical difficulties present themselves. Gases are formed, which, being formed, tend to tear the enamel coating. Again, if the salt be a soluble one, it may in some measure dissolve in the substance of the slip itself, before its reduction is by means of heat accomplished, and, thus distributing itself, the salt becomes less effective for its intended purpose. Such distribution of the cobalt salt in the substance of the slip may be additionally disadvantageous in the matter of the color of the ultimate glass coating. Again, a soluble salt dissolving itself in the substance of the slip tends to cause the substance of the slip to set in objectionable way.

This invention consists in a more direct way of forming upon the steel surface a film of a suitable cobalt compound,—typically, the oxide. I have found it possible to make a suspension of the insoluble cobalt oxide in a fluid (ordinarily water) and to apply this suspension directly to the steel surface, and then to dry the so applied material. An adherent film of cobalt oxide remains, and the article with its film may then be dipped in the enamel slip in the usual manner. If the cobalt oxide be ground very fine, I have found it possible to effect the suspension of it in water, so that the suspension may be sprayed upon the steel surface. I have additionally found that a more stable suspension may be effected, and the invention more satisfactorily performed, if a suspending agent be present in the water, together with the finely ground cobalt oxide. This suspending agent may be of organic character, such as ammonium linoleate, for example, but preferably it will be clay of carefully selected quality. Instead of spraying the cobalt-oxide suspension upon the surface of the steel article, it is alternatively possible to dip the article in the suspension. In either case, after drying, a coating of oxide remains, and the coated article may then be dipped in the enamel slip, and the otherwise usual practice of enameling may proceed.

In the firing of the article, the cobalt oxide, and such iron oxides as well as may inevitably be present, are dissolved in the glass and, present immediately adjacent the steel surface, are of value in effecting a more perfect and durable union between the steel and the glass. And there are other compounds of cobalt which, insoluble in water and refractory to all temperatures to which the blank is subject prior to ultimate firing, will in like manner, under the conditions of firing, enter solution in the glass and serve to effect a more perfect and durable union. Among such other compounds are the silicate and the borate of cobalt.

And in the practice of the invention the compound of cobalt may be associated with one or another of the insoluble and refractory compounds (including the oxides, the borates, and the silicates) of one or more of the metals nickel and manganese.

I have, however, found that I have got best results by grinding together cobalt oxide and bentonite, and effecting suspension of the ground material in water, the substances being employed in the ratio of 3 grams of cobalt oxide, to 1½ grams of bentonite, to 100 cubic centimeters of water.

Manifestly the practical suspending liquid is water, but other liquids are available which, susceptible to being completely driven off by drying, will serve the purpose with success. Such another liquid is alcohol; another is benzene.

I claim as my invention:

1. The method herein described of preparing a steel surface for the reception of an enamel coating which consists in spreading upon the surface a liquid suspension of finely ground cobalt oxide together with clay, driving off the suspending liquid, and leaving upon the surface a residual film of the suspended material.

2. The method herein described of preparing a steel surface for the reception of an enamel coating which consists of spreading upon the surface a liquid suspension of a compound of cobalt of a group consisting of the oxide the silicate and the borate, in finely divided condition, together with a solid suspending agent, driving off the suspending liquid, and leaving upon the surface a residual film of the suspended material.

JACOB E. ROSENBERG.